(12) United States Patent
Katano et al.

(10) Patent No.: US 10,029,580 B2
(45) Date of Patent: Jul. 24, 2018

(54) FUEL CELL VEHICLE

(75) Inventors: Koji Katano, Toyota (JP); Hiroyuki Sekine, Nisshin (JP); Ikuhiro Nakamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 71 days.

(21) Appl. No.: 14/396,446

(22) PCT Filed: Apr. 27, 2012

(86) PCT No.: PCT/JP2012/061379
§ 371 (c)(1),
(2), (4) Date: Mar. 26, 2015

(87) PCT Pub. No.: WO2013/161059
PCT Pub. Date: Oct. 31, 2013

(65) Prior Publication Data
US 2015/0197165 A1    Jul. 16, 2015

(51) Int. Cl.
| | |
|---|---|
| *B60L 11/18* | (2006.01) |
| *B60K 1/00* | (2006.01) |
| *B60K 1/04* | (2006.01) |
| *H01M 8/04828* | (2016.01) |
| *H01M 8/2475* | (2016.01) |

(52) U.S. Cl.
CPC ............ *B60L 11/1883* (2013.01); *B60K 1/00* (2013.01); *B60K 1/04* (2013.01); *B60L 11/1896* (2013.01); *H01M 8/0494* (2013.01); *H01M 8/2475* (2013.01); *B60K 2001/0416* (2013.01); *B60L 2210/14* (2013.01); *B60Y 2306/01* (2013.01); *H01M 2250/20* (2013.01); *Y02T 10/7225* (2013.01); *Y02T 90/32* (2013.01); *Y02T 90/34* (2013.01)

(58) Field of Classification Search
CPC .... B60L 11/1883; B60L 11/1896; B60K 1/00; B60K 1/04; H01M 8/0494; H01M 8/2475
See application file for complete search history.

(56) References Cited

U.S. PATENT DOCUMENTS

| | | |
|---|---|---|
| 2007/0178345 A1 | 8/2007 | Takeda et al. |
| 2012/0006607 A1 | 1/2012 | Ohashi |

FOREIGN PATENT DOCUMENTS

| | | | |
|---|---|---|---|
| JP | H04-303167 A | 10/1992 | |
| JP | 2007-207582 A | 8/2007 | |
| JP | 2010-272458 | * 12/2010 | .............. H01M 8/04 |

* cited by examiner

*Primary Examiner* — Oi K Conley
(74) *Attorney, Agent, or Firm* — Hunton Andrews Kurth LLP

(57) ABSTRACT

A protection bar is arranged between a fuel cell casing and a DC-DC converter in the left-right direction of a fuel cell vehicle. Two fastening surfaces, each being a part of the fuel cell casing, and an FDC flange, which is a part of the DC-DC converter, are fastened and fixed to each other, with one being vertically superimposed on the other, in a space above or below the protection bar.

11 Claims, 13 Drawing Sheets

FIG.11
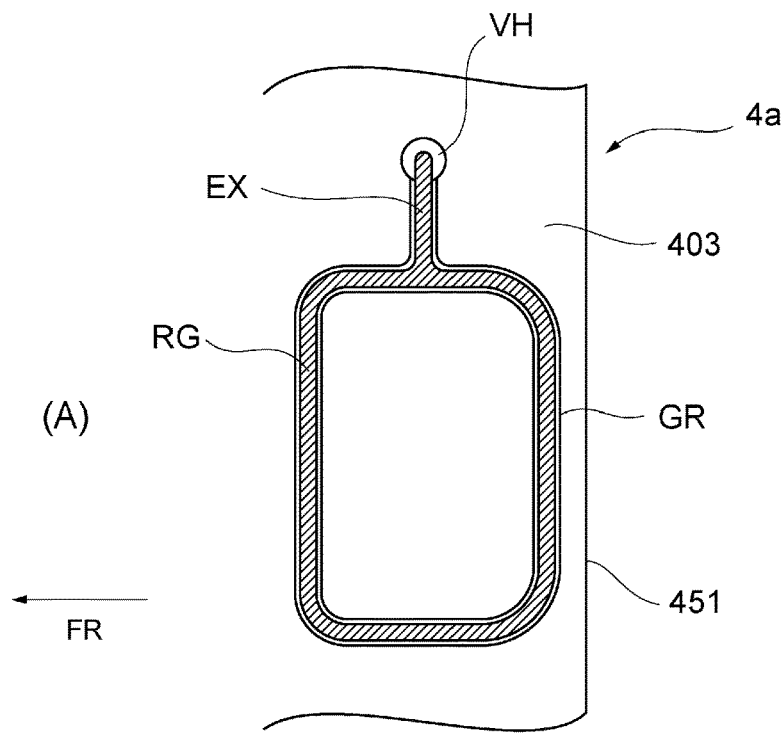
(A)
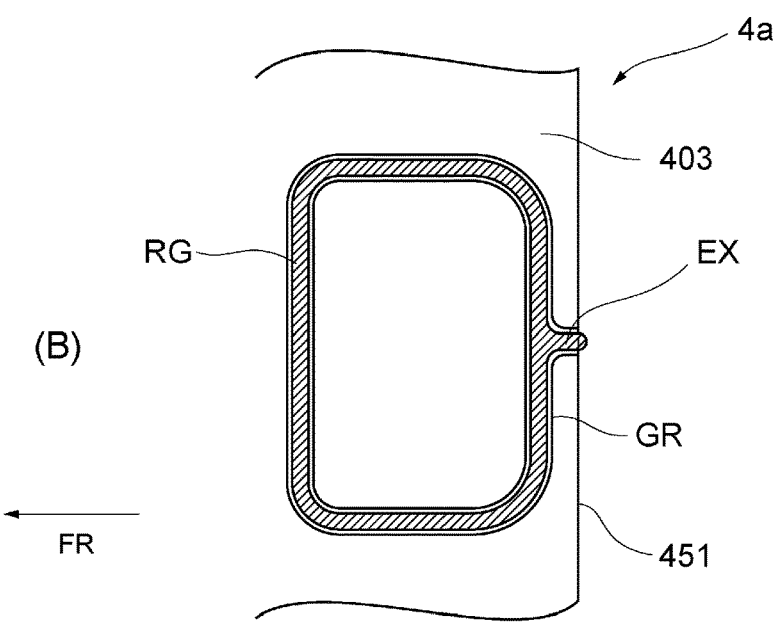
(B)

FUEL CELL VEHICLE

CROSS-REFERENCE TO RELATED APPLICATIONS

This is a national phase application based on the PCT International Patent Application No. PCT/JP2012/061379 filed Apr. 27, 2012, the entire contents of which are incorporated herein by reference.

TECHNICAL FIELD

The present invention relates to a fuel cell vehicle.

BACKGROUND ART

In recent years, as a counter-measure against global warming and the future depletion of petroleum, fuel cell vehicles that drive using electric power supplied from a fuel cell system are under development. Such fuel cell vehicle has a fuel cell stack in which a plurality of fuel cells is connected in series, and a boost converter that outputs electric power by increasing output voltage of the fuel cell stack.

Usually, both the fuel cell stack and the boost converter are arranged in a space below the floor panel in order to ensure a large seating space for passengers. As described in Patent Document 1 indicated below, one possible arrangement is for the fuel cell stack and boost converter to be stored in a single housing and the housing to be arranged in a space below the floor panel.

However, a protection bar for suppressing distortion of the vehicle in a side crash is arranged below the floor panel in the left-right direction of the vehicle. Thus, when the fuel cell stack and boost converter are stored in a single large housing, arranging such housing in a space below the floor panel is difficult because the housing and the protection bar interfere with each other.

In order to avoid interference with the protection bar, it is necessary to store the fuel cell stack in a different casing (fuel cell casing) from that of the boost converter and to arrange the fuel cell casing rearward of the protection bar in the vehicle while arranging the boost converter forward of the protection bar in the vehicle. The reason for arranging the boost converter forward of the fuel cell stack in the vehicle is that the electric power output from the boost converter need to be supplied to a traction motor which is arranged at the front of the vehicle.

The fuel cell stack and boost converter arranged as set forth above need to be electrically connected to each other in a space therebetween, namely, a space above or below the protection bar. Here, the mass of the fuel cell stack is larger than that of the boost converter, and the fuel cell stack and boost converter accordingly have different vibration systems (natural frequencies) from each other. Thus, from the point of view of the durability of their electrical connection alone, connecting them with a flexible braided bus bar is one option. However, braided bus bars are expensive and it is thus desirable to use a plate-like bus bar from the viewpoint of suppressing an increase in cost.

Considering the above, in a practical and desirable configuration, the fuel cell casing and the boost converter are fastened and fixed to each other in a space above or below the protection bar, and electrically connected to each other using a plate-like bus bar, in such a manner that the fuel cell casing and the boost converter vibrate as a unit wherever possible (i.e. their vibration systems conform to each other).

PRIOR ART REFERENCE

Patent Document

Patent Document 1: JP2007-207582 A

SUMMARY OF THE INVENTION

Problem to be Solved by the Invention

However, the spaces above and below the protection bar arranged in the left-right direction of the vehicle are narrow and it is difficult to ensure a sufficient height. Consequently, when the fuel cell casing and the boost converter are fastened and fixed to each other in such narrow space, it is difficult to ensure sufficient strength for suppressing each of them from individually vibrating.

For example, one possible configuration is for a first fastening part extending above the protection bar toward the front of the vehicle to be formed for the fuel cell casing, a second fastening part extending above the protection bar toward the rear of the vehicle to be formed for the boost converter, and the first and second fastening parts to be fastened and fixed to each other with their tips brought into contact with each other. In this configuration, the fastening surface is formed in the vertical direction. However, as described above, in the space above the protection bar, it is difficult to ensure a sufficient length of such fastening surface in the vertical direction. As a result, the vertical distance between the bolts is reduced and sufficient fastening strength cannot be attained. In addition, the bolts for fastening need to be inserted in the horizontal direction in this configuration and this makes it difficult to carry out the fastening operation from above a front panel, which is also a problem.

The present invention has been made in view of the above-described problems. An object of the present invention is to provide a fuel cell vehicle in which a fuel cell casing and a boost converter can be fastened and fixed to each other with sufficient strength in a space above or below a protection bar which is arranged in the left-right direction of the vehicle.

Means for Solving the Problem

In order to solve the above problems, a fuel cell vehicle according to the present invention comprises: a fuel cell stack; a fuel cell casing storing the fuel cell stack therein; and a boost converter arranged forward of the fuel cell casing in the vehicle, the boost converter outputting electric power by increasing output voltage of the fuel cell stack, wherein a protection bar is arranged between the fuel cell casing and the boost converter in the left-right direction of the vehicle, and wherein a first fastening part, which is a part of the fuel cell casing, and a second fastening part, which is a part of the boost converter, are fastened and fixed to each other, with one being vertically superimposed on the other, in a space above or below the protection bar.

In the present invention, a first fastening part, being a part of the fuel cell casing, and a second fastening part, being a part of the boost converter, are fastened and fixed to each other, with one being vertically superimposed on the other, in a space above or below the protection bar, and thus, the fastening surface therebetween extends not vertically but horizontally. Accordingly, even in a space above or below the protection bar in which a sufficient height cannot be ensured, it is possible to make the fastening surface large and ensure sufficient fastening strength between the fuel cell casing and the boost converter.

Furthermore, since the fastening surface extends horizontally, fastening bolts are inserted vertically, and thus, the fastening operation can be easily performed from above a front panel.

In the fuel cell vehicle according to the present invention, it is preferable for the first fastening part and the second fastening part to be fastened and fixed to each other, with one being superimposed on the other so that the first fastening part is below the second fastening part.

The fuel cell casing storing the fuel cell stack is larger in both mass and shape than the boost converter. Thus, when installing such fuel cell casing and boost converter into the fuel cell vehicle, it is desirable to install the fuel cell casing first and then install the boost converter by performing alignment, etc.

In the above preferable mode, the first fastening part and the second fastening part are fastened and fixed to each other with one being superimposed on the other so that the first fastening part is below the second fastening part. This means that the fuel cell casing which is large in mass and shape is installed first and the boost converter is installed next, which makes the installation operation easy.

In the fuel cell vehicle according to the present invention, it is also preferable that: the first fastening part has a raised part that protrudes toward the boost converter; the second fastening part has a recessed part that retracts in a direction opposite to the fuel cell casing; and the first fastening part and the second fastening part are fastened and fixed to each other with the raised part and the recessed part being engaged with each other.

In this preferable mode, the first fastening part of the fuel cell casing has a raised part protruding toward the boost converter, while the second fastening part of the boost converter has a recessed part retracting in a direction opposite to the fuel cell casing. With this configuration, when the boost converter is fastened and fixed to the fuel cell casing, alignment therebetween can be performed by engaging the recessed part of the second fastening part with the raised part of the first fastening part. In other words, the recessed part of the second fastening part is guided by the raised part of the first fastening part, and as a result, the operation of fastening and fixing the boost converter to the fuel cell casing, while aligning the same, can be easily performed.

In the fuel cell vehicle according to the present invention, it is also preferable for the raised part to be formed such that a length thereof in the left-right direction of the vehicle gradually increases from the top down of the vehicle.

When fastening and fixing the boost converter to the fuel cell casing, the alignment therebetween in the left-right direction of the vehicle is performed by engaging the recessed part of the second fastening part with the raised part of the first fastening part. In order to perform such alignment with high accuracy, the raised part and the recessed part are desirably configured so as to be engaged with each other with a small gap therebetween in the left-right direction of the vehicle. However, if the gap between the raised part and the recessed part is small, the operation of engagement itself is rather difficult to perform, and this is a problem.

In this preferable mode, the raised part is formed such that the length thereof in the left-right direction of the vehicle gradually increases from the top down of the vehicle. When fastening and fixing the boost converter to the already-installed fuel cell casing, if the raised part and the recessed part are engaged with each other at a position higher than the final fastening/fixation position, the engagement therebetween can be easily performed because the gap therebetween in the left-right direction of the vehicle is relatively large. When the boost converter is thereafter moved down with the raised part and the recessed part being kept engaged, the gap between the raised part and the recessed part gradually decreases (and the boost converter is guided to the accurate position) and, finally, a small gap is left therebetween. As stated above, in this preferable mode, the operation of fastening and fixing the boost converter and the fuel cell casing, while aligning the same with a high degree of accuracy, can be easily performed.

In the fuel cell vehicle according to the present invention, it is also preferable for the raised part to have an internal space formed therein.

In this preferable mode, the internal space formed within the raised part can be effectively used as a space for wiring, pipes, etc.

In the fuel cell vehicle according to the present invention, it is also preferable for a part of a bus bar for extracting electric power from the fuel cell stack to be arranged in the internal space.

In this preferable mode, a part of a bus bar for extracting electric power from the fuel cell stack and supplying it to the boost converter is arranged in the internal space formed within the raised part. By using the internal space formed within the raised part as a space for routing the bus bar, the limited space within the fuel cell vehicle can be used more effectively.

In the fuel cell vehicle according to the present invention, it is also preferable for a control unit for controlling the fuel cell stack to be arranged in the internal space.

In this preferable mode, a control unit for controlling the fuel cell stack is arranged in the internal space formed within the raised part. By using the internal space formed within the raised part as a space for storing the control unit, the limited space within the fuel cell vehicle can be used more effectively.

Effect of the Invention

According to the present invention, a fuel cell vehicle can be provided in which a fuel cell casing and a boost converter can be fastened and fixed to each other with sufficient strength in a space above or below a protection bar which is arranged in the left-right direction of the vehicle.

BRIEF DESCRIPTION OF THE DRAWINGS

FIG. 11 is a bottom view illustrating a part of a DC-DC converter to be installed in a fuel cell vehicle according to another embodiment.

MODE FOR CARRYING OUT THE INVENTION

Hereinafter, embodiments of the present invention will be described, with reference to the attached drawings. To facilitate understanding of the descriptions, the same elements will be given the same reference signs wherever possible in each drawing and repetitive descriptions will be omitted.

Figure 1:
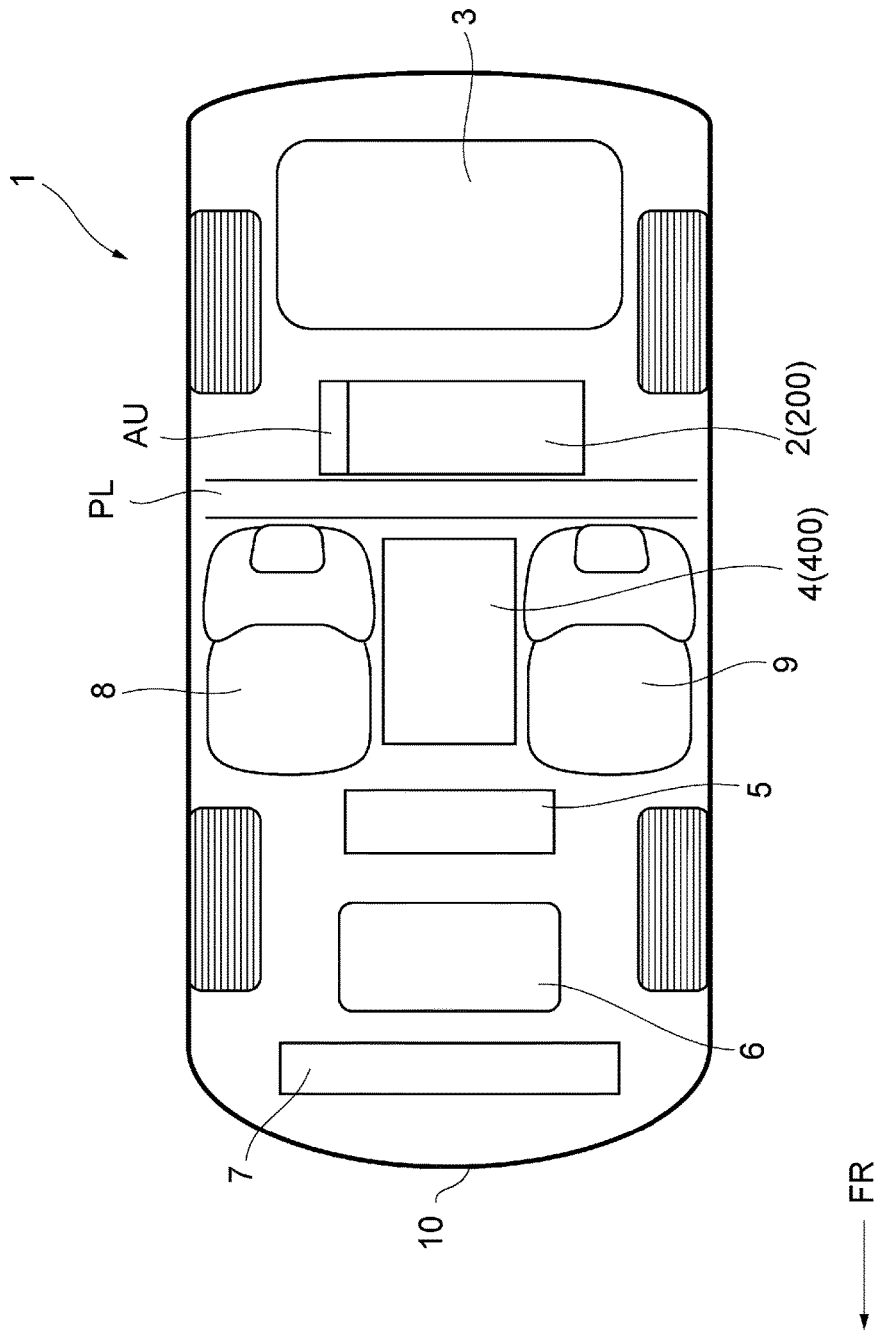
FIG. 1 is a view schematically illustrating the configuration of a fuel cell vehicle which is an embodiment of the present invention, when seen from above.

Firstly, the configuration of a fuel cell vehicle which is an embodiment of the present invention will be described with reference to FIG. 1. FIG. 1 is a view schematically illustrating the configuration of a fuel cell vehicle which is an embodiment of the present invention, when seen from above. As illustrated in FIG. 1, a fuel cell vehicle 1 is constituted by a fuel cell apparatus 2, a fuel tank 3, a DC-DC converter 4, an inverter 5, a traction motor 6 and a radiator 7.

In the below description, unless otherwise specified, the term "forward" means the travelling direction of the fuel cell vehicle 1 (the direction referred to as "FR" in FIG. 1, etc.) and the term "rearward" means the direction in which the fuel cell vehicle 1 travels backwards. Further, the "right side" means the right side in the travelling direction of the fuel cell vehicle 1 and the "left side" means the left side in the travelling direction of the fuel cell vehicle 1.

The fuel cell apparatus 2 is an apparatus that generates electric power for driving the fuel cell vehicle 1 and it is arranged below the floor panel of the fuel cell vehicle 1. A part (top part) of the fuel cell apparatus 2 is arranged within the center tunnel formed between a driver's seat 8 and a front passenger's seat 9.

The fuel cell apparatus 2 has a configuration in which a fuel cell stack, formed by stacking a plurality of fuel cells (unit cells) and electrically connecting them in series, is stored within a fuel cell casing 200. Each unit cell is, for example, a polymer electrolyte type fuel cell, having a structure in which: an air electrode is provided on one surface of an electrolyte membrane, being an ion exchange membrane; a fuel electrode is provided on the other surface of the electrolyte membrane; and a pair of separators is provided to sandwich the air electrode and fuel electrode therebetween. In such cells, hydrogen gas is supplied to a hydrogen gas passage of one separator and oxidant gas is supplied to an oxidant gas passage of the other separator, and electric power is generated through chemical reaction between these reactant gases.

A plurality of unit cells is stacked in the left-right direction of the fuel cell vehicle 1. An auxiliary device unit AU storing auxiliary devices, such as a fuel gas pump, therein, is connected and fixed to one end of the fuel cell casing 200 in the unit cell stacking direction (an end on the right side of the fuel cell vehicle 1).

The fuel tank 3 is a tank for storing hydrogen gas to be supplied to the fuel cell apparatus 2 and the fuel tank 3 is arranged at the rear part of the fuel cell vehicle 1. The flow rate of the hydrogen gas supplied from the fuel tank 3 to the fuel cell apparatus 2 is controlled by a control apparatus and a flow rate regulating valve, etc., which are not shown in the drawing, in accordance with the required power which is determined by, for example, the degree of opening of the accelerator.

The DC-DC converter 4 is a direct-current voltage converter and has a function of increasing the direct-current voltage of the power input from the fuel cell apparatus 2 (the output voltage of the fuel cell stack) and outputting the resulting power to the inverter 5. In this embodiment, the DC-DC converter 4 is arranged below the floor panel of the fuel cell vehicle 1 and within the center tunnel formed between the driver's seat 8 and the front passenger's seat 9. The DC-DC converter 4 is arranged forward of the fuel cell apparatus 2, in a state of being stored in an FDC container 400.

A protection bar PL is arranged below the floor panel in the left-right direction of the fuel cell vehicle 1 so as to suppress distortion of the vehicle in a side crash. Although several protection bars PL are arranged below the floor panel, FIG. 1 shows only part of them.

Owing to this, a large space extending continuously in the front-back direction of the fuel cell vehicle 1 cannot be obtained in the space below the floor panel. As a result, as shown in FIG. 1, the fuel cell casing 200 is arranged rearward of the protection bar PL, while the DC-DC converter 4 is arranged forward of the protection bar PL. In other words, the fuel cell casing 200 and the DC-DC converter 4 are arranged so as to be lined up in the front-back direction of the fuel cell vehicle 1, with one protection bar PL being sandwiched therebetween.

In FIG. 1, for the sake of convenience in schematically showing the positional relationship between the fuel cell casing 200 and the DC-DC converter 4, they are illustrated as being spaced apart from each other. In fact, however, the DC-DC converter 4 is fastened and fixed to the fuel cell casing 200 in the space below the floor panel at a portion above the protection bar PL. Further, the fuel cell casing 200 and the DC-DC converter 4 are electrically connected to each other in that fastened and fixed portion. The specific method of fastening and fixation and the method of electric connection will be described in further detail later.

The inverter 5 has a function of converting the direct-current power output from the DC-DC converter 4 to a three-phase alternating-current power and supplying the obtained power to the traction motor 6. The inverter 5 is adapted to operate by receiving an input voltage of 650 V, which is greater than the output voltage of the fuel cell apparatus 2. Since the DC-DC converter 4 is arranged between the fuel cell apparatus 2 and the inverter 5, the DC-DC converter 4 plays a role of bridging the gap between the output voltage of the fuel cell apparatus 2 and the input voltage at which the inverter 5 can operate.

The traction motor 6 is an electromagnetic motor that is supplied with three-phase alternating-current power output from the inverter 5 and generates a driving force for driving the fuel cell vehicle 1. The driving force generated by the traction motor 6 is regulated by a control device (not shown in the drawing) calculating required power based on the degree of opening of the accelerator, etc., and controlling the output power of the fuel cell apparatus 2 and the output power of the inverter 5 based on the calculated required power.

The radiator 7 is a device for cooling the fuel cell apparatus 2, the DC-DC converter 4, the traction motor 6, etc., which constitute the fuel cell vehicle 1. The radiator 7 causes a cooling medium to circulate between the radiator and the respective devices to be cooled through pipes, which are not shown in FIG. 1. The outside air introduced through a vent hole 10 provided at a bumper portion of the fuel cell vehicle 1 receives heat from the cooling medium passing through the radiator 7, thereby achieving the cooling of the respective devices. For this reason, the radiator 7 is arranged at a portion closest to the front end of the vehicle.

Figure 2:
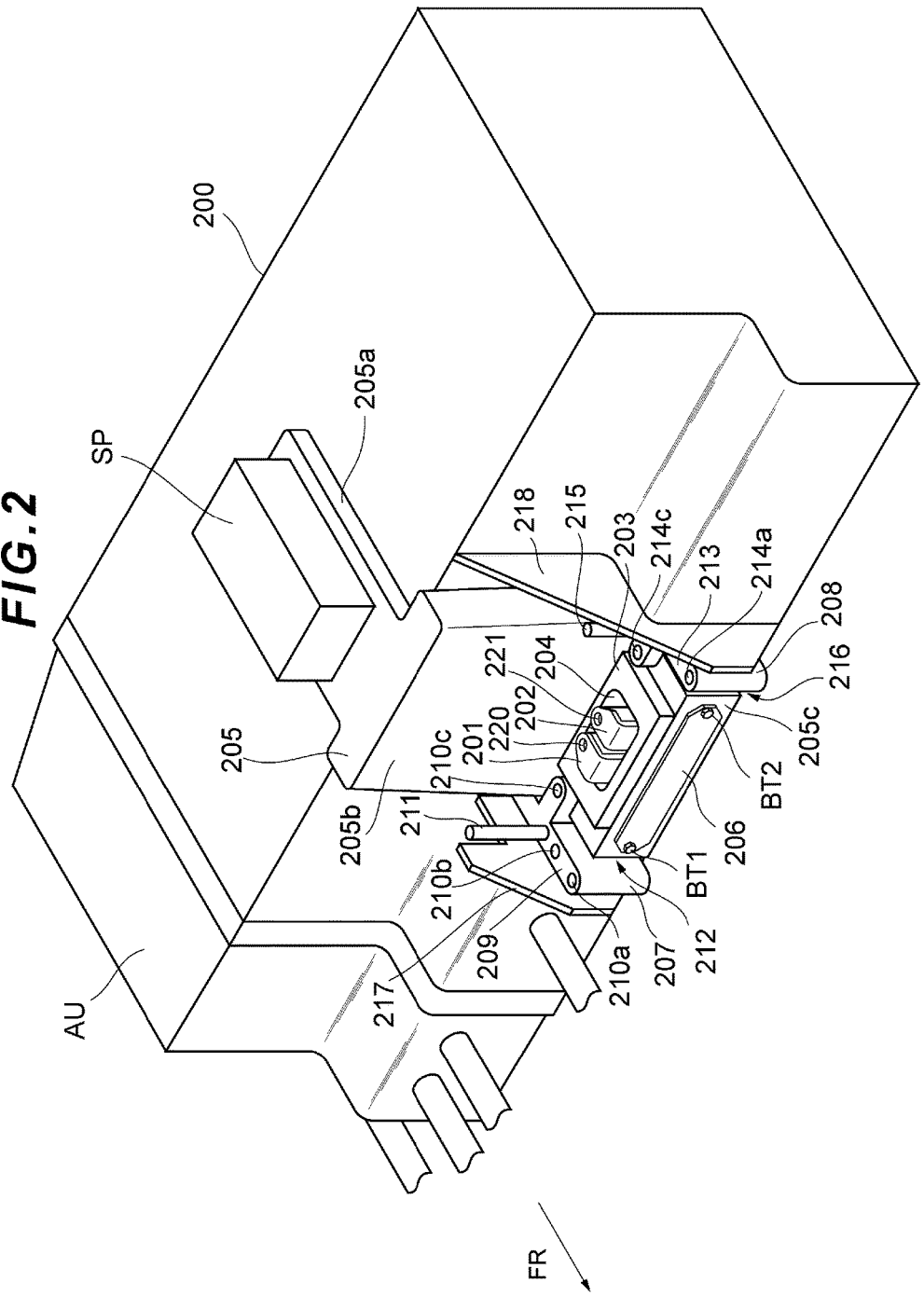
FIG. 2 is a perspective view illustrating the appearance of a fuel cell casing to be installed in the fuel cell vehicle shown in FIG. 1.

Next, the specific shape of the fuel cell casing 200 will be described with reference to FIG. 2. As shown in FIG. 2, the fuel cell casing has a substantially rectangular cuboid shape and is arranged so that the longitudinal direction thereof is aligned with the left-right direction of the fuel cell vehicle 1. Inside the fuel cell casing 200, a plurality of unit cells is stacked in the left-right direction of the fuel cell vehicle 1 and stored in the stacked state.

The auxiliary device unit AU connected and fixed to a side surface of the fuel cell casing 200 has, when seen from the side of the fuel cell vehicle 1, approximately the same outer shape as the fuel cell casing 200. Thus, the fuel cell casing 200 and the auxiliary device unit AU can be regarded as forming one substantially rectangular cuboid shape together.

The fuel cell casing 200 has a horizontal FC seal surface 203 which is formed at a position close to the forward end of the fuel cell casing 200 and lower than the top surface of the fuel cell casing 200. On the FC seal surface 203, a substantially rectangular through-hole 204 is formed so that the long side thereof is aligned with the left-right direction of the fuel cell vehicle 1. Two bus bars (FC bus bars 201 and 202), serving as terminals for outputting the electric power generated by the fuel cell apparatus 2 toward the DC-DC converter 4, are arranged so as to be lined up in the left-right direction of the fuel cell vehicle 1 and these FC bus bars protrude upward from the through-hole 204. The FC bus bars 201 and 202 respectively have fastening bolt holes 220 and 221, each being formed at the tip thereof, close to the center.

A service plug SP serving as a safety device is arranged at an upper portion of the fuel cell casing 200 and in the center in the left-right direction of the fuel cell vehicle 1 (in other words, at the center portion of the substantially rectangular cuboid shape including the fuel cell casing 200 and the auxiliary device unit AU). The service plug SP has a pull-out plug, which is not shown in the drawing, and if an operator pulls out the pull-out plug, the fuel cell apparatus 2 can be electrically disconnected from the FC bus bars 201 and 202. The service plug SP protrudes upward of the fuel cell casing 200 and a part thereof is arranged in an internal space of the center tunnel of the fuel cell vehicle 1.

The service plug SP is connected to the FC bus bars 201 and 202 via an internal bus bar, not shown in the drawing. The internal bus bar is stored within an FC bus bar casing 205 so as not be exposed to the outside of the fuel cell casing 200. The FC bus bar casing 205 is arranged so as to extend from the top surface of the fuel cell casing 200 toward the forward side surface of the fuel cell casing 200. The FC bus bar casing 205 has: a first horizontal part 205a arranged between the service plug SP and the fuel cell casing; a vertical part 205b, extending downward from the forward end of the first horizontal part 205a; and a second horizontal part 205c, extending forward from the lower end of the vertical part 205b. The first horizontal part 205a, the vertical part 205b and the second horizontal part 205c each have an internal space formed therein and they communicate with each other.

In the FC bus bar casing 205, it should be noted that, in addition to the internal bus bar, a control unit for performing control of the overall operation of the fuel cell apparatus 2, such as control of the power generation by the fuel cell stack, may further be arranged in the internal space of the vertical part 205b. Further, other components may also be arranged so as to effectively use the internal space of the FC bus bar casing 205.

The width of the vertical part 205b in the left-right direction is greater than that of the first horizontal part 205a but is smaller than the entire width of the fuel cell casing 200. Further, both of the right and left side surfaces of the vertical part 205b are slightly inclined so that each upper end approaches the center. Accordingly, the length (width) of the vertical part 205b in the left-right direction gradually increases from the top down.

The forward side surface of the vertical part 205b is perpendicular to the front-back direction of the fuel cell vehicle 1. As shown in FIG. 2, as a result of arranging the vertical part 205b, the forward side surface of the fuel cell casing 200 partly protrudes forward.

The second horizontal part 205c has, on a top surface thereof, the above-described FC seal surface 203 and through-hole 204. In the internal space of the second horizontal part 205c, the FC bus bars 201 and 202 protruding upward from the through-hole 204 are connected to the internal bus bar extending from the service plug SP.

A service hole is formed on the forward side surface of the second horizontal part 205c, through the internal space of the second horizontal part 205c, and a service cover 206 covers the service hole. The service hole is an opening formed for the purpose of performing the operation of fastening and fixing the FC bus bar 201, etc., to the internal bus bar within the second horizontal part 205c.

The service cover 206 is fixed to the second horizontal part 205c with bolts BT1 and BT2, so that the bolts BT1 and BT2 protrude forward from the forward side surface of the second horizontal part 205c.

The fuel cell casing 200 has fastening bases 207 and 208 which are formed so as to sandwich the second horizontal part 205c from the right and left sides thereof. The fastening base 207 is located on the right side of the second horizontal part 205c and has a horizontal fastening surface 209 at the same level as the FC seal surface 203. Three internally threaded bolt insertion holes 210a, 210b and 210c are formed on the fastening surface 209. Of these, the bolt insertion holes 210a and 210b are formed so as to make a line in the front-back direction of the fuel cell vehicle 1. Meanwhile, the rearmost bolt insertion hole 210c on the fastening surface 209 is formed at a position inside (left side) of the line made by the bolt insertion holes 210a and 210b. Further, a lower end of a shaft 211 is fixed to the fastening surface 209 at a position on the extended line of the line made by the bolt insertion holes 210a and 210b and rearward of the bolt insertion holes 210a and 210b. The shaft 211 is a cylindrical metal shaft and it is fixed perpendicularly to the fastening surface 209 so that the center axis thereof extends in the vertical direction.

Instead of providing the shaft 211 on the extended line of the line made by the bolt insertion holes 210a and 210b, the shaft 211 may be provided forward of the bolt insertion hole 210c. In other words, the shaft 211 may be arranged so that the lower end of the shaft 211 and the bolt insertion hole 210c make a line extending in the front-back direction of the fuel cell vehicle 1.

The left side surface of the portion of the fastening base 207, where the bolt insertion holes 210a and 210b are formed, is spaced apart from the right side surface of the second horizontal part 205c, so that a gap 212 is formed therebetween.

The fastening base 208 is located on the left side of the second horizontal part 205c and has a horizontal fastening surface 213 at the same level as the FC seal surface 203. Three internally threaded bolt insertion holes 214a, 214b and 214c are formed on the fastening surface 213. Of these, the bolt insertion holes 214a and 214b are formed so as to make a line in the front-back direction of the fuel cell vehicle 1. Meanwhile, the rearmost bolt insertion hole 214c on the fastening surface 213 is formed at a position inside (right side) of the line made by the bolt insertion holes 214a and 214b. Further, a lower end of a shaft 215 is fixed to the fastening surface 213 at a position on the extended line of the line made by the bolt insertion holes 214a and 214b and rearward of the bolt insertion holes 214a and 214b. The shaft 215 is a cylindrical metal shaft and it is fixed perpendicularly to the fastening surface 213 so that the center axis thereof extends in the vertical direction. The shaft 215 has the same length as that of the shaft 211.

Instead of providing the shaft 215 on the extended line of the line made by the bolt insertion holes 214a and 214b, the shaft 215 may be provided forward of the bolt insertion hole 214c. In other words, the shaft 215 may be arranged so that the lower end of the shaft 215 and the bolt insertion hole 214c make a line extending in the front-back direction of the fuel cell vehicle 1.

The right side surface of the portion of the fastening base 208, where the bolt insertion holes 214a and 214b are formed, is spaced apart from the left side surface of the second horizontal part 205c, so that a gap 216 is formed therebetween.

On the forward side surface of the fuel cell casing 200, two FC ribs 217 and 218 are formed so as to protrude forward. The FC ribs 217 and 218 are thin plates arranged so as to be parallel to each other and facing each other. The FC ribs 217 and 218 are formed at positions for allowing the fastening bases 207 and 208 to be sandwiched therebetween. In other words, the FC rib 217 is formed at a position on the right side of the fastening base 207 and the FC rib 218 is formed at a position on the left side of the fastening base 208.

Figure 3:
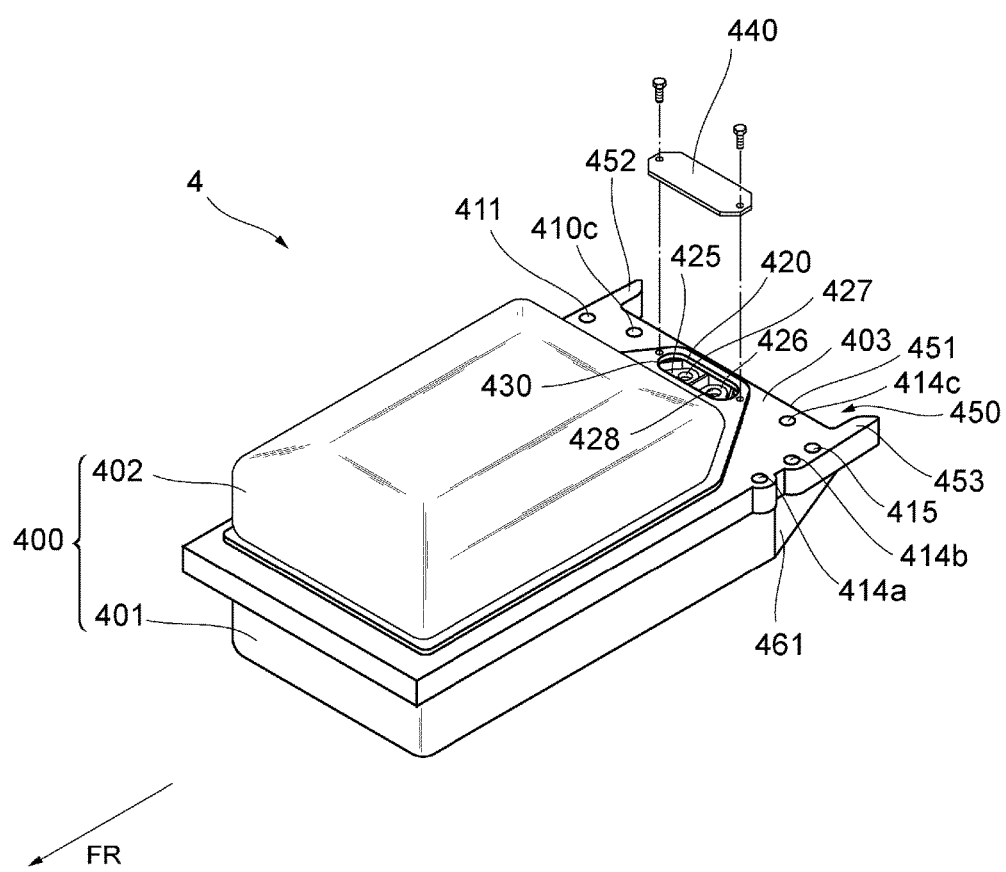
FIG. 3 is a perspective view illustrating the appearance of a DC-DC converter to be installed in the fuel cell vehicle shown in FIG. 1.
Figure 4:
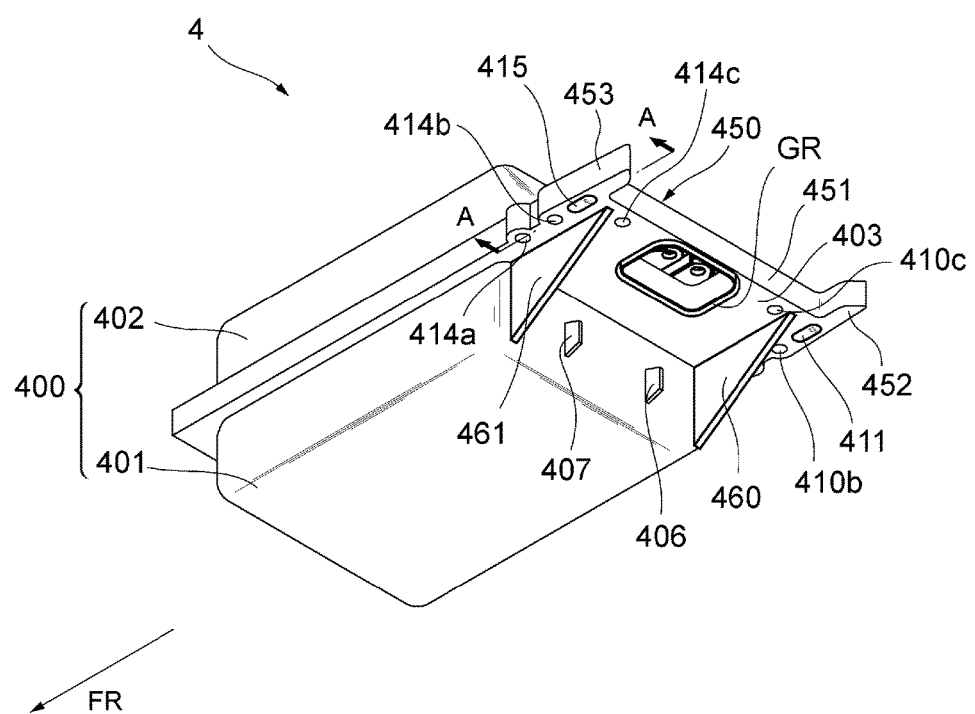
FIG. 4 is a perspective view illustrating the appearance of a DC-DC converter to be installed in the fuel cell vehicle shown in FIG. 1.

Referring next to FIGS. 3 and 4, the specific shape of the DC-DC converter 4 will be described. FIGS. 3 and 4 are each a perspective view of the DC-DC converter 4.

The DC-DC converter 4 is a direct-current voltage converter including several reactors (coils), switching circuits, capacitors, etc., and these components are stored inside the FDC container 400 composed of an FDC casing 401 and an FDC cover 402. The FDC casing 401 has an opening on the top and serves as a casing that supports the components of the DC-DC converter 4 from the bottom. A horizontal top seal surface is formed at the upper end of the FDC casing 401. The FDC cover 402 is a cap to cover the top opening of the FDC casing 401 and is fastened and fixed to the FDC casing 401 in a state where the lower end of the FDC cover 402 is in contact with the top seal surface of the FDC casing 401.

A plate-like FDC flange 403 is formed at the upper end and rear side of the FDC casing 401, so as to horizontally protrude rearward. As will be described later below, when fastening and fixing the DC-DC converter 4 to the fuel cell casing 200, the FDC flange 403 serves as a portion which is to be superimposed on the fastening surfaces 209 and 213 of the fuel cell casing 200 from above and fastened and fixed to those fastening surfaces.

The FDC flange 403 has six bolt through-holes 410a, 410b, 410c, 414a, 414b and 414c which are formed vertically therethrough. Of these, the bolt through-holes 410a and 410b are formed at a portion close to the right end of the FDC flange 403 so as to be lined up in the front-back direction of the fuel cell vehicle 1. The bolt through-hole 410c is formed rearward of, and to the left (close to the center) of the bolt through-holes 410a and 410b. The bolt through-holes 414a and 414b are formed at a portion close to the left end of the FDC flange 403 so as to be lined up in the front-back direction of the fuel cell vehicle 1. The bolt through-hole 414c is formed rearward of, and to the right (close to the center) of the bolt through-holes 414a and 414b.

These bolt through-holes 410a, 410b, 410c, 414a, 414b and 414c are formed, when seen from above in a state where the DC-DC converter 4 is fastened and fixed to the fuel cell casing 200, at the same positions as the bolt insertion holes 210a, 210b, 210c, 214a, 214b and 214c, respectively. As can be clearly seen from the above descriptions, the DC-DC converter 4 and the fuel cell casing 200 are fixed to each other by aligning the bolt insertion holes 210a, etc., with the bolt through-holes 410a, etc., and then inserting bolts into the holes from above and tightening the bolts.

A shaft through-hole 411 is formed in the FDC flange 403 at a position on the extended line of the line made by the bolt through-holes 410a and 410b and rearward of the bolt through-holes 410a and 410b. Similarly, a shaft through-hole 415 is formed in the FDC flange 403 at a position on the extended line of the line made by the bolt through-holes 414a and 414b and rearward of the bolt through-hole 414a and 414b. The shaft through-holes 411 and 415 are formed, when seen from above in a state where the DC-DC converter 4 is fastened and fixed to the fuel cell casing 200, at the same positions as the shafts 211 and 215, respectively.

At the center part in the left-right direction of the FDC flange 403, a substantially rectangular through-hole 420 is formed so that the long side thereof is aligned with the left-right direction of the fuel cell vehicle 1. The through-hole 420 is formed so as to have substantially the same shape as that of the through-hole 204 in the fuel cell casing 200. Further, the through-hole 420 is formed, when seen from above in a state where the DC-DC converter 4 is fastened and fixed to the fuel cell casing 200, at the same position as that of the through-hole 204.

Inside the through-hole 420, two bus bars (FDC bus bars 425 and 426), serving as terminals for receiving electric power generated by the fuel cell apparatus 2, are arranged so as to be lined up in the left-right direction of the fuel cell vehicle 1. The FDC bus bars 425 and 426 are electrically connected to the FC bus bars 201 and 202, respectively, and the FDC bus bars 425 and 426 are arranged so as to horizontally protrude rearward from inside of the FDC container 400. The FDC bus bars 425 and 426 are arranged, when seen from above in a state where the DC-DC converter 4 is fastened and fixed to the fuel cell casing 200, at positions overlapping with the positions of the FC bus bars 201 and 202, respectively. The FDC bus bars 425 and 426 respectively have fastening bolt holes 427 and 428, each being formed at the tip thereof, close to the center.

A part of the FDC cover 402 extends rearward and covers a part of the FDC flange 403 from above. In the FDC cover 402, a through-hole 430 is formed at a position above the through-hole 420 formed in the FDC flange 403. The through-hole 430 is formed so as to enable the operation of fastening the FC bus bar 201 and the FDC bus bar 425 and the operation of fastening the FC bus bar 202 and the FDC bus bar 426 to be carried out from above. After the completion of such fastening operation, a protection cover 440 is attached so as to cover the through-hole 430. This protection cover 440 is for limiting access to the FC bus bar 202, etc., and is fastened and fixed to the FDC container 400 with bolts at both ends in the left-right direction thereof.

A part of the rearward end (the center part in the left-right direction) of the FDC flange 403 retracts in a direction opposite to the fuel cell casing 200 (forward direction), thereby forming a recessed part 450. To put it another way, the rearward end of the FDC flange 403 has an end surface 451 which is perpendicular to the front-back direction of the fuel cell vehicle 1, and corners 452 and 453 protruding rearward, respectively, from the left and right ends of the end surface 451.

The distance (spacing) between the corners 452 and 453 is substantially the same as the width in the left-right direction of the lower end of the vertical part 205b in the FC bus bar casing 205. In a state where the DC-DC converter 4 is fastened and fixed to the fuel cell casing 200, the recessed part 450 and the vertical part 205b are engaged with each other. In other words, the right side surface of the vertical part 205b faces the inner surface of the corner 452 in the left-right direction, while the left side surface of the vertical part 205b faces the inner surface of the corner 453 in the left-right direction.

Two FDC ribs 460 and 461 are formed below the FDC flange 403 and support the FDC flange 403 from below. The FDC rib 460 is formed in a plate shape, perpendicular to the left-right direction of the vehicle, with the upper part thereof being connected to the lower surface of the FDC flange 403 and the front side thereof being connected to the rearward side surface of the FDC casing 401. The thickness (width in the left-right direction) of the FDC rib 460 is slightly smaller than the width of the gap 212 formed in the fastening base 207. In a state where the DC-DC converter 4 is fastened and fixed to the fuel cell casing 200, the FDC rib 460 is inserted into the gap 212.

The FDC rib 461 is formed in a plate shape, perpendicular to the left-right direction of the vehicle, with the upper part thereof being connected to the lower surface of the FDC flange 403 and the front side thereof being connected to the rearward side surface of the FDC casing 401. The thickness (width in the left-right direction) of the FDC rib 461 is slightly smaller than the width of the gap 216 formed in the fastening base 208. In a state where the DC-DC converter 4 is fastened and fixed to the fuel cell casing 200, the FDC rib 461 is inserted into the gap 216.

Figure 5:
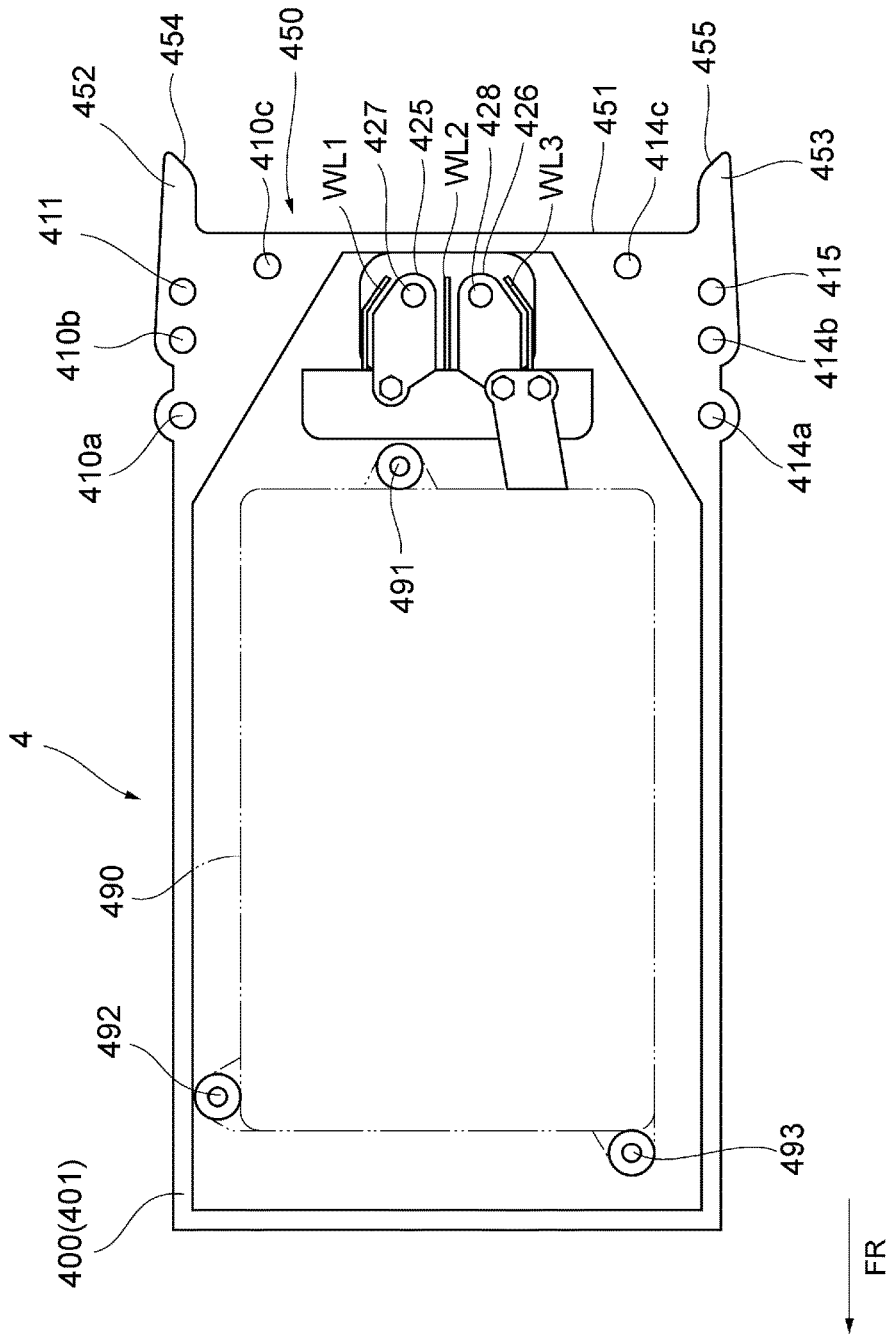
FIG. 5 is a view schematically illustrating the internal structure of a DC-DC converter to be installed in the fuel cell vehicle shown in FIG. 1, when seen from above.

Referring now to FIG. 5, the internal configuration of the FDC container 400 will be briefly described. FIG. 5 is a view schematically illustrating the internal structure of the DC-DC converter 4, when seen from above, in a state where the FDC cover 402 of the DC-DC converter 4 is removed. As shown in FIG. 5, several reactors (coils), switching circuits, and capacitors, etc., constituting a voltage converter are formed as a unit within the FDC container 400 and such unit 490 is fastened and fixed to the FDC casing 401 with three bolts 491, 492 and 493.

The unit 490 is fastened and fixed to the FDC casing 401 at three locations—one at the rear side (bolt 491) and two at the front side (bolts 492 and 493). By arranging only one fastening location at the rear side, namely, at the side close to the FDC flange 403, the fastening locations for fixing the unit 490 can be arranged without making such locations close to the bolt through-hole 410a, etc., formed in the FDC flange 403.

Figure 6:
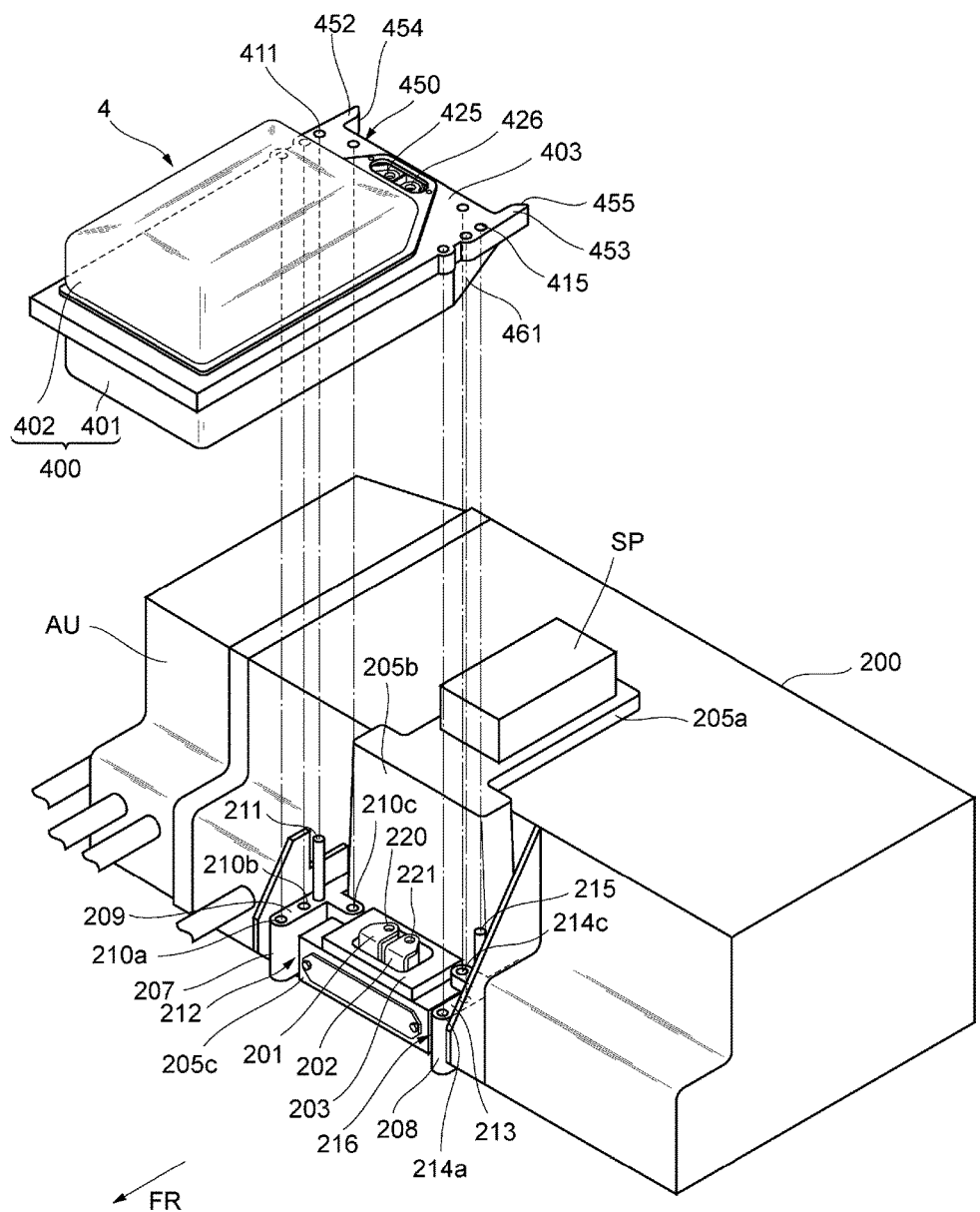
FIG. 6 is a view for explaining the arrangement of a fuel cell casing and a DC-DC converter in the fuel cell vehicle shown in FIG. 1.

Referring next to FIG. 6, etc., the procedure for arranging the fuel cell casing 200 and the DC-DC converter 4 below the floor panel of the fuel cell vehicle 1 and fastening and fixing them will be described. FIG. 6 is a view for explaining the arrangement of the fuel cell casing 200 and the DC-DC converter 4 in the fuel cell vehicle 1.

The fuel cell casing 200 is first arranged and fixed to a predetermined position below the floor panel, before arranging the DC-DC converter 4. The fuel cell casing 200 is arranged with the FC seal surface 203 on the forward side thereof, and fastened and fixed to the vehicle body frame, etc., below the floor panel. Here, the position of the fuel cell casing 200 is such that one of the protection bars PL (not shown in FIG. 6), arranged in the left-right direction of the fuel cell vehicle 1, exists vertically below the fastening bases 207 and 208.

When the fuel cell casing 200 is fixed to the predetermined position, the DC-DC converter 4 is then arranged. The DC-DC converter 4 is arranged with the FDC flange 403 facing the fuel cell casing 200 (rearward), such that the FDC flange 403 covers from above the fastening bases 207 and 208 and FC seal surface 203.

Specifically, the recessed part 450 of the FDC flange 403 is engaged firstly with a portion of the vertical part 205b close to the upper end thereof. As already explained above, the length (width) of the vertical part 205b in the left-right direction gradually increases from the top down. Further, the distance (spacing) between the corner 452 and the corner 453 is made substantially the same as the width in the left-right direction of the lower end of the vertical part 205b in the FC bus bar casing 205. Thus, when the recessed part 450 is engaged with the portion of the vertical part 205b close to the upper end thereof, a certain looseness exists between the recessed part 450 and the vertical part 205b in the left-right direction. Such looseness enables the operation of engaging the recessed part 450 with the portion close to the upper end of the vertical part 205b (rough alignment in the left-right direction) to be performed with ease.

The corner 452 and the corner 453 have tapered parts 454 and 455, formed at their respective tips. As a result, the distance (spacing) between the corners 452 and 453 becomes larger toward the rear side. Accordingly, the recessed part 450 is guided by such tapered parts 454 and 455 so as to be engaged with the vertical part 205b, and this makes the operation of engaging the recessed part 450 with the portion close to the upper end of the vertical part 205b much easier.

Further, the tip of the corner 452 and the tip of the corner 453 have a rounded shape when seen from above. Thus, damage of the fuel cell casing 200 can be suppressed, even if the tip of the corner 452, etc., hits the fuel cell casing 200 by error during the operation of engaging the recessed part 450 with the portion close to the upper end of the vertical part 205b.

After that, while keeping the vertical part 205b and the recessed part 450 of the FDC flange 403 engaged with each other, the DC-DC converter 4 is gradually lowered so as to bring the FDC flange 403 close to the fastening bases 207 and 208. During this process, the shaft 211 is inserted through the shaft through-hole 411 and the shaft 215 is inserted through the shaft through-hole 415.

Figure 7:
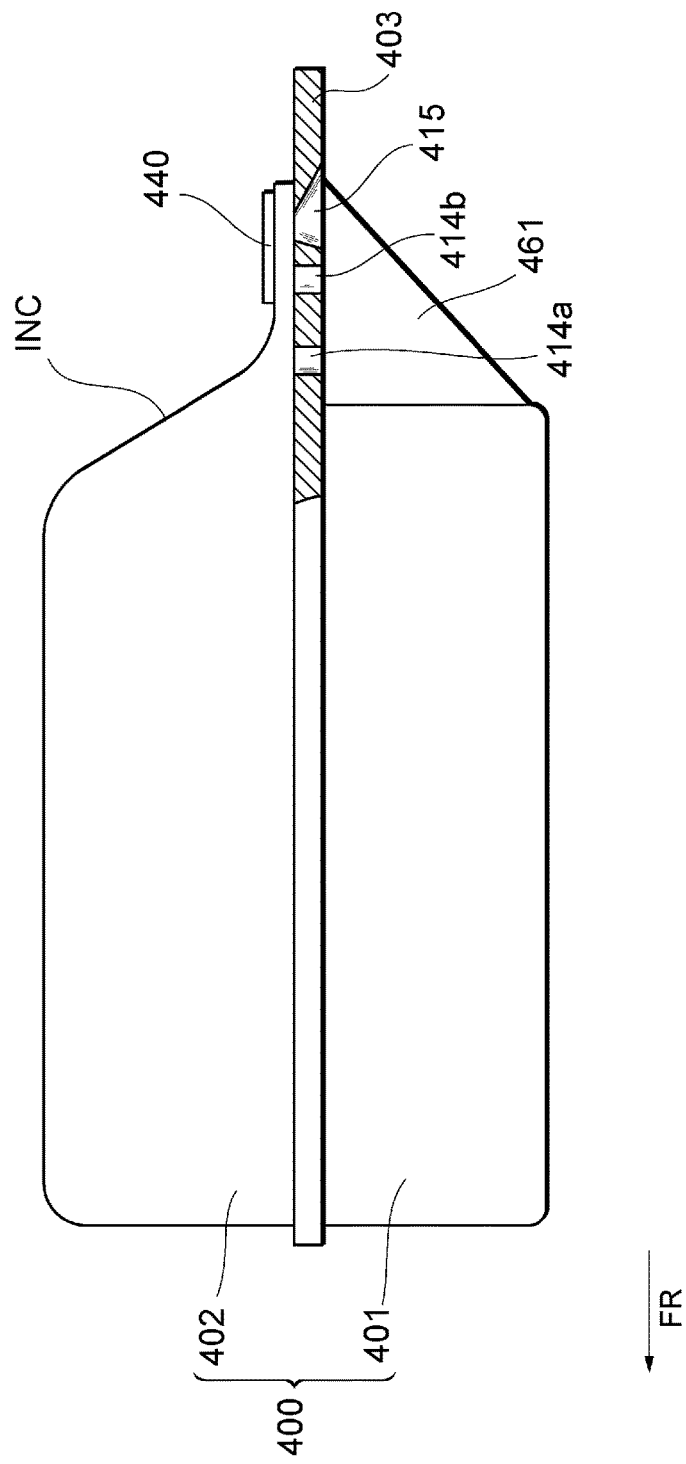
FIG. 7 is a cross-sectional view of FIG. 4 along the line A-A.

FIG. 7 is a cross-sectional view of FIG. 4 along the line A-A. As shown in FIG. 7, the shaft through-hole 415 is formed such that the inner surface thereof does not extend perpendicularly, but is inclined. The shaft through-hole 415 has a substantially circular opening at the upper end thereof, while having, at the lower end, an elliptical opening, the longer axis of which extends in the front-back direction. The forward side of the inner surface of the shaft through-hole 415 is inclined so that the upper portion is closer to the rear side, and the rearward side of the inner surface of the shaft through-hole 415 is inclined so that the upper portion is closer to the front side. Further, the inner surface of the shaft through-hole 415 is formed such that the inclination angle of the rearward side is moderate, relative to that of the forward side.

Although the cross-section of the shaft through-hole 411 is not shown in the drawing, the shaft through-hole 411 is formed in a similar manner to the shaft through-hole 415. That is, the inner surface of the shaft through-hole 411 is formed such that the inclination angle of the rearward side is moderate, relative to that of the forward side.

Since the shaft through-holes 411 and 415 are formed as described above, the shafts 211 and 215 are securely inserted through the respective shaft through-holes 411 and 415 during the process of bringing the FDC flange 403 close to the fastening bases 207 and 208.

The reason why the inner surface of the shaft through-holes 411 and 415 is formed such that the inclination angle of the rearward side is moderate, relative to that of the forward side, is as follows. During the process of lowering the DC-DC converter 4, the degree of freedom that allows the DC-DC converter 4 to be displaced rearward of the predetermined position is relatively small (since the end surface 451 of the FDC flange 403 hits the vertical part 205b). Thus, even if the forward side of the inner surface of the shaft through-holes 411 and 415 has a steep angle of inclination, the shafts 211 and 215 can be securely guided into the respective shaft through-holes 411 and 415 without missing such shaft through-holes.

On the other hand, the degree of freedom that allows the DC-DC converter 4 to be displaced forward of the predetermined position is relatively large. Thus, in this embodiment, by making the inclination angle of the forward side of the inner surface of the shaft through-holes 411 and 415 moderate, a larger amount of displacement can be allowed. As a result, the shafts 211 and 215 are securely guided into the respective shaft through-holes 411 and 415 without missing such shaft through-holes.

Referring back to FIG. 6, the description thereof will now be continued. When the shaft 211 is inserted through the shaft through-hole 411 and the shaft 215 is inserted through the shaft through-hole 415, the DC-DC converter 4 is then moved close to the fastening bases 207 and 208 of the fuel cell casing 200 while being guided and aligned by the shafts 211 and 215. At that time, the gap between the recessed part 450 and the vertical part 205b in the left-right direction of the fuel cell vehicle 1 gradually decreases, and thus, the DC-DC converter 4 is guided to the predetermined position (the position fastened and fixed to the fuel cell casing 200) also by the vertical part 205b that engages with the recessed part 450.

Further, the FDC rib 460 enters the gap 212 formed in the fastening base 207 and the FDC rib 461 enters the gap 216 formed in the fastening base 208. Thus, the DC-DC converter 4 is also guided to the predetermined position (the position fastened and fixed to the fuel cell casing 200) by the gaps 212 and 216.

The DC-DC converter 4 moves down while being guided by the shafts 211 and 215, the vertical part 205b, and the gaps 212 and 216 as described above, and is finally arranged in a state where the lower surface of the FDC flange 403 is in contact with the fastening surface 209 of the fastening base 207 and the fastening surface 213 of the fastening base 208. In this state, the positions of the bolt through-holes 410a, 410b and 410c formed in the FDC flange 403 correspond to the positions of the bolt insertion holes 210a, 210b and 210c formed in the fastening base 207, respectively, when seen from above. Similarly, the positions of the bolt through-holes 414a, 414b and 414c formed in the FDC flange 403 correspond to the positions of the bolt insertion holes 214a, 214b and 214c formed in the fastening base 208, respectively, when seen from above.

Further, the lower surface of the FDC bus bar 425 is in contact with the top surface of the FC bus bar 201, and the position of the fastening bolt hole 427 corresponds to the position of the fastening bolt hole 220, when seen from above. Similarly, the lower surface of the FDC bus bar 426 is in contact with the top surface of the FC bus bar 202, and the position of the fastening bolt hole 428 corresponds to the position of the fastening bolt hole 221, when seen from above. In this state, bolts BT3 and BT4 (not shown in the drawing) are inserted into the respective fastening bolt holes 427 and 428, and tightened. As a result, the FDC bus bar 425 and FC bus bar 201 are electrically connected to each other and the FDC bus bar 426 and the FC bus bar 202 are electrically connected to each other.

Figure 8:
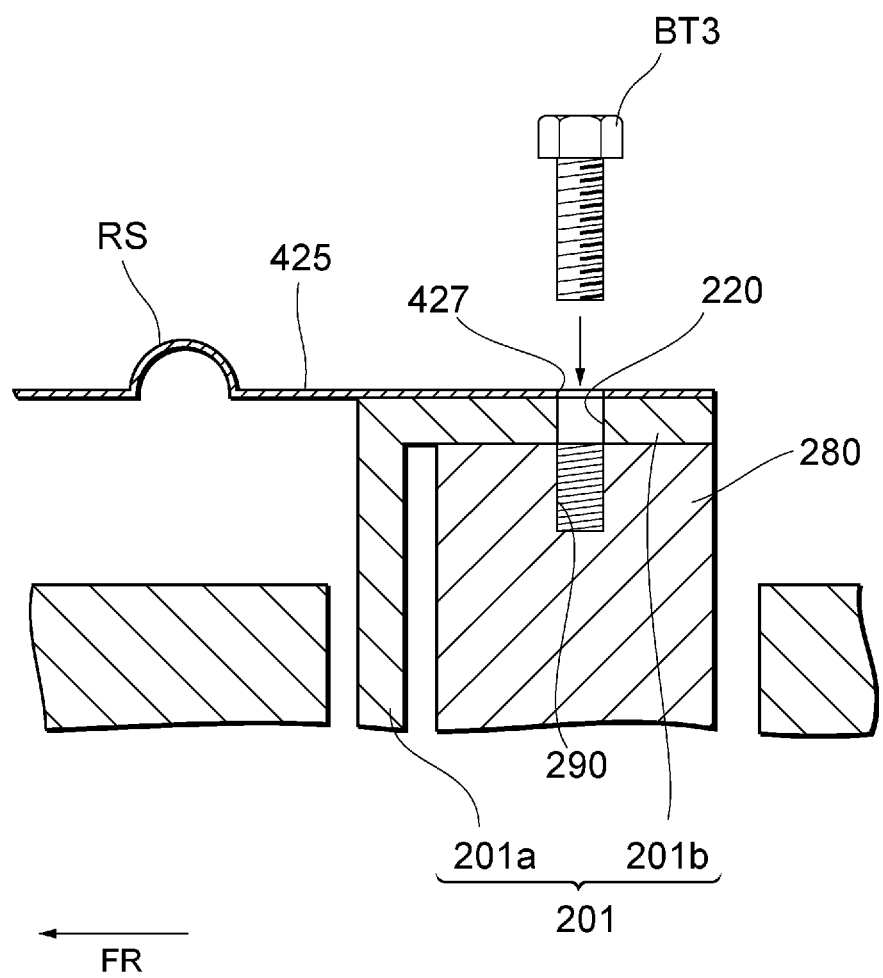
FIG. 8 is a cross-sectional view for explaining the configuration of a fastening and fixation portion between an FDC bus bar and an FC bus bar.

The configuration of the connection part between the FDC bus bar 425 and the FC bus bar 201 will now be described with reference to FIG. 8. FIG. 8 is a cross-sectional view for explaining the configuration of the fastened and fixed portion between the FDC bus bar 425 and the FC bus bar 201. It should be noted that since the configuration of the connection part between the FDC bus bar 426 and the FC bus bar 202 is the same as the configuration of the connection part between the FDC bus bar 425 and the FC bus bar 201, which will be described below, the description thereof will be omitted.

As shown in FIG. 8, the FC bus bar 201 has a first portion 201a which is arranged so as to extend vertically, and a second portion 201b which is arranged so as to extend horizontally, rearward from the upper end of the first portion 201a. The second portion 201b is a portion in which the fastening bolt hole 220, which is already described above, is formed.

A bus bar supporting column 280 is provided below the second portion 201b. The bus bar supporting column 280 is a column having substantially the same shape as that of the second portion 201b when seen from above, and the lower end thereof is fixed to the fuel cell casing 200. The upper end of the bus bar supporting column 280 forms a horizontal surface, in which a vertically-extending fixation bolt hole 290 is formed. The fixation bolt hole 290, when seen from above, has substantially the same shape as that of the fastening bolt hole 220, and is formed at the same position as that of the fastening bolt hole 220. The inner circumference of the fixation bolt hole 290 is threaded to form an internal thread.

When the DC-DC converter 4 is moved down and arranged at a predetermined position for fastening and fixing it to the fuel cell casing 200, the lower surface of the FDC bus bar 425 comes into contact with the top surface of the FC bus bar 201, and the fastening bolt hole 427, the fastening bolt hole 220 and the fixation bolt hole 290 are all at the same position, when seen from above, as shown in FIG. 8. In this state, a bolt BT3 is inserted into the fixation bolt hole from above, and tightened. As a result, the FDC bus bar 425 and the FC bus bar 201 are electrically connected to each other while being fixed to the bus bar supporting column 280.

In the FDC bus bar 425, a curved part RS is formed at a portion forward of the portion that is in contact with the FC bus bar 201, the curved part RS protruding upward to create an arch in the cross-section shown in FIG. 8. Owing to this, the FDC bus bar 425 can easily cause elastic deformation at such curved part RS, which makes it easy for the portion rearward of the curved part RS to move up and down. As a result, even if the lower surface of the FDC bus bar 425 and the top surface of the FC bus bar 201 are not exactly at the same level, due to assembly errors, etc., the two surfaces can easily be made at the same level by allowing the the FDC bus bar 425 to deform at the curved part.

Here, as shown in FIG. 5, etc., anti-drop walls WL1 and WL2 are provided on the right and left sides of the FDC bus bar 425. The anti-drop walls WL1 and WL2 are each a vertically-extending plate-like member which extends toward a portion close to the tip of the FDC bus bar 425. Further, the spacing (spacing in the left-right direction) between the anti-drop walls WL1 and WL2 is made smaller at the rear side. Further, the height of the upper end of the anti-drop walls WL1 and WL2 exceeds the height of the top surface of the FDC bus bar 425.

By providing such anti-drop walls WL1 and WL2, a bolt BT3 is prevented from dropping down, by error, while performing the operation of tightening the bolt BT3. It should be noted that, at the portion forward of the fastening bolt hole 427, the anti-drop walls WL1 and WL2 have a larger spacing therebetween, and accordingly, the anti-drop walls WL1 and WL2 will not interfere when performing the operation of tightening the bolt BT3.

It should also be noted that the FC bus bar 201 has a thickness larger than that of the FDC bus bar 425, as shown in FIG. 8. This is because the temperature of the FC bus bar 201 is more likely to increase due to the effect of heat caused by power generation of the fuel cell apparatus 2 and it is thus necessary to increase the cross-section of the bus bar so as to reduce the electric resistance.

As described above, in the fuel cell vehicle 1 according to this embodiment, the fastening bases 207 and 208, each being a part of the fuel cell casing 200, and the FDC flange 403, which is a part of the DC-DC converter 4, are fastened and fixed to each other, with one being vertically superimposed on the other, in a space above the protection bar PL. As a result, the fastening surface therebetween extends not vertically but horizontally. Accordingly, even in a space above the protection bar PL, where a sufficient height cannot be ensured, a large fastening surface can be formed, so that sufficient fastening strength can be ensured between the fuel cell casing 200 and the DC-DC converter 4. It should be noted that, although the fastening bases 207 and 208 are fastened to the FDC flange 403 in a space above the protection bar PL in this embodiment, they may alternatively be fastened in a space below the protection bar PL and this arrangement also brings about the same effect as above.

Figure 9:
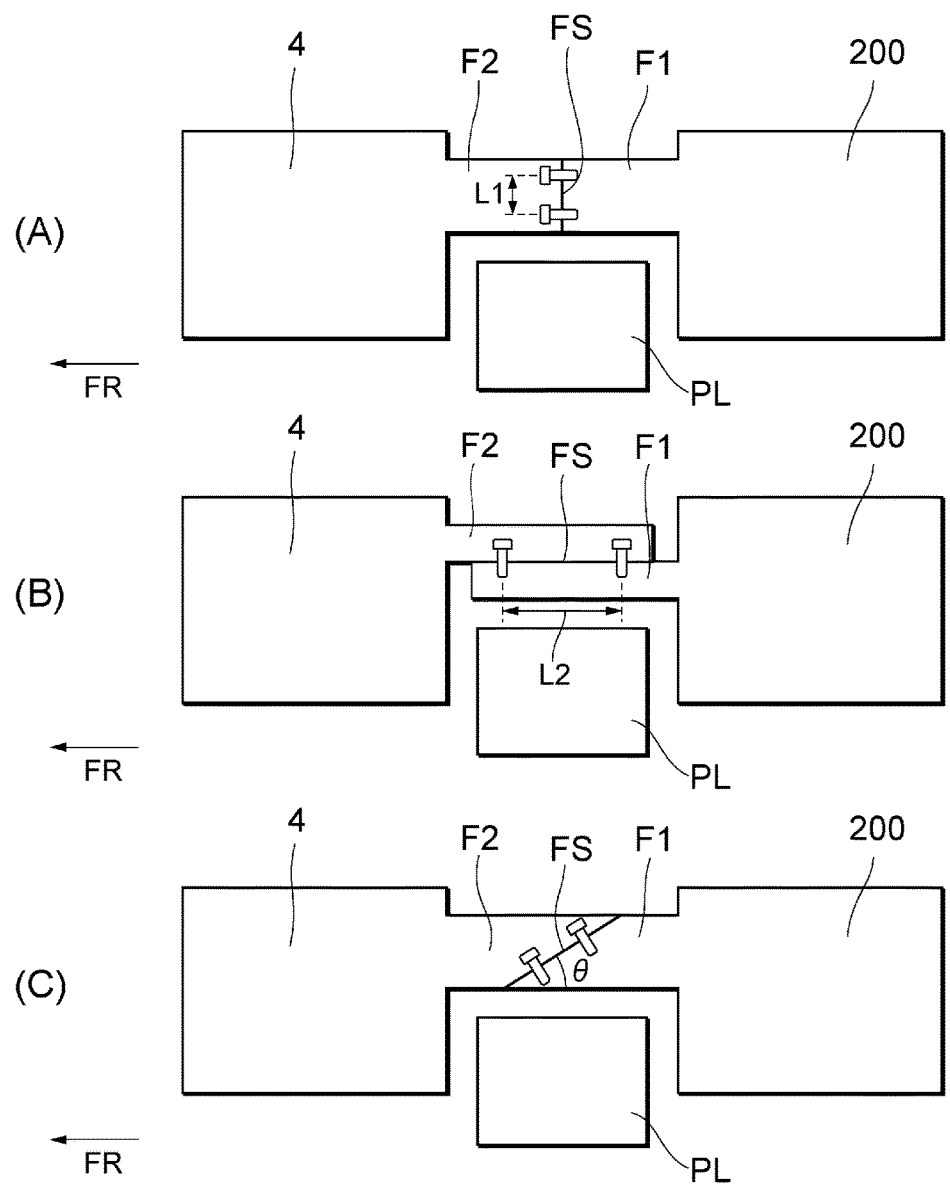
FIG. 9 is a schematic view for explaining a fastening method of a fuel cell casing and a DC-DC converter by way of comparison with a conventional configuration.

Further descriptions will be made with reference to FIG. 9. FIG. 9 is a schematic view for explaining the fastening method of the fuel cell casing 200 and the DC-DC converter 4 by comparing it with a conventional configuration.

In the conventional configuration shown in FIG. 9A, a fastening part F1 that extends above the protection bar PL toward the front side of the vehicle is formed in the fuel cell casing, while a fastening part F2 that extends above the protection bar PL toward the rear side of the vehicle is formed in the DC-DC converter 4, and the fastening parts F1 and F2 are fastened and fixed to each other with the tips of the fastening parts F1 and F2 being in contact with each other. In this configuration, a fastening surface FS is formed vertically. However, in a space above the protection bar PL, it is difficult to ensure a sufficient length of the fastening surface FS in the vertical direction. As a result, the distance (L1) between the bolts in that vertical direction is reduced and sufficient fastening strength cannot be ensured. In addition, since it is necessary to insert the fastening bolts horizontally in this configuration, there is another problem in which it is difficult to carry out the fastening operation from above a front panel.

On the other hand, in the configuration of this embodiment shown in FIG. 9B, the fastening part F1 and the fastening part F2 are fastened and fixed to each other, with one being vertically superimposed on the other, in a space above the protection bar PL. The fastening surface therebetween extends not vertically but horizontally and the distance (L2) between the bolts in that horizontal direction can accordingly be made longer, and as a result, sufficient fastening strength can be ensured.

Moreover, in the conventional configuration shown in FIG. 9A, the fastening bolts are inserted horizontally, and thus, the fastening operation is difficult to perform from above a front panel. In contrast, in the configuration of this embodiment shown in FIG. 9B, the fastening bolts are inserted vertically, and the fastening operation can thus be performed easily from above a front panel.

It should be noted that, as another embodiment, the fastening part F1 and the fastening part F2 may be configured to have an inclined fastening surface therebetween, as shown in FIG. 9C. In that case, the angle θ of the fastening surface FS relative to the horizontal plane is desirably smaller than 45 degrees, considering that the end of the bolt-hole formed in the fastening part F1 approaches the fuel cell casing.

In the fuel cell vehicle 1 according to this embodiment, the vertical part 205b (raised part) of the FC bus bar casing 205 is provided near the fastening bases 207 and 208 of the fuel cell casing 200, so as to protrude toward the DC-DC converter 4. Further, the FDC flange 403 of the DC-DC converter 4 has the recessed part 405 that retracts in a direction opposite to the fuel cell casing 200. With this configuration, when fastening and fixing the DC-DC converter 4 to the fuel cell casing 200, the alignment between the DC-DC converter 4 and the fuel cell casing 200 can be performed by engaging the recessed part 450 of the FDC flange 403 with the vertical part 205b (raised part). In other words, the recessed part 450 is guided by the vertical part 205b (raised part), and accordingly, the operation of fastening and fixing the DC-DC converter 4 to the fuel cell casing 200, while aligning the same, can be easily performed.

The fastening bases 207 and 208 and the raised part may be formed as separate members, or they may be formed as a unit. For example, a (single) horizontal fastening flange having bolt insertion holes 210a, 210b, 210c, 214a, 214b and 214c formed therein may be formed in the fuel cell casing 200, such that the fastening flange has a raised part on the top surface thereof and the raised part is engaged with the recessed part 450 of the FDC flange 403.

Figure 10:
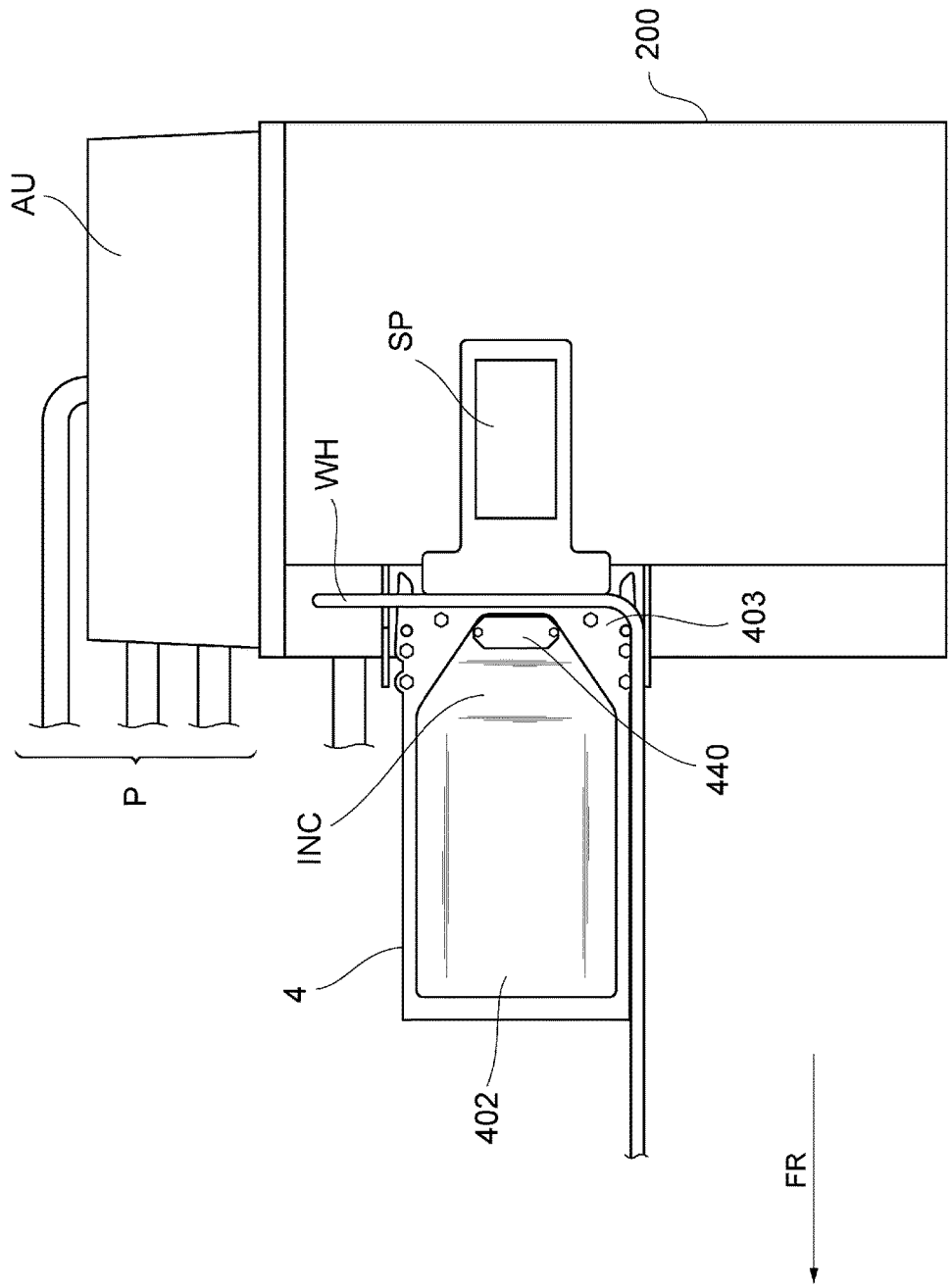
FIG. 10 is a top view illustrating a state in which a DC-DC converter is fastened and fixed to a fuel cell casing.

The following are supplemental descriptions of the configuration of the fuel cell vehicle 1, with regard to the portions other than those already described above. FIG. 10 is a top view illustrating the state in which the DC-DC converter 4 is fastened and fixed to the fuel cell casing 200. As shown in FIG. 10, a wire harness WH for supplying electric power from a battery to the auxiliary devices, such as a fuel gas supply pump, is connected to the auxiliary device unit AU. The battery is arranged at the front side of the fuel cell vehicle 1, and the wire harness WH needs to be routed forward from the auxiliary device unit AU. However, many pipes P, such as exhaust pipes, are arranged in the right side of the fuel cell vehicle 1, where the auxiliary device unit AU is arranged, and thus, it is not possible to route the wire harness WH in that area.

Accordingly, an inclined part INC is provided rearward of the FDC cover 402 in the fuel cell vehicle 1. The wire harness WH is delivered to the left side of the fuel cell vehicle 1 via the space above the inclined part INC and arranged to run forward through the left side of the DC-DC converter 4. By providing the inclined part INC rearward of the FDC cover 402 in this way, the space for routing the wire harness can be ensured.

Referring back to FIG. 4, two plate-like projections 406 and 407 are formed on the rearward side surface of the FDC casing 401 at a portion below the FDC flange 403, so that the projections 406 and 407 protrude rearward. The plate-like projections 406 and 407 are formed at positions corresponding to the bolts BT1 and BT2 for fastening and fixing the service cover 206 of the fuel cell casing 200, and in a state where the DC-DC converter 4 is fastened and fixed to the fuel cell casing 200, the tips of the plate-like projections 406 and 407 come close to the bolts BT1 and BT2, respectively.

If the bolts BT1 and BT2 are loosened with the DC-DC converter 4 being kept fastened and fixed to the fuel cell casing 200, the tips of the bolts BT1 and BT2 interfere with the respective tips of the plate-like projections 406 and 407, which means that this configuration can prevent the bolts BT1 and BT2 from being removed with the DC-DC converter 4 being kept fastened and fixed to the fuel cell casing 200.

As shown in FIG. 4, on the lower surface of the FDC flange 403, an O-ring groove GR is formed so as to surround the periphery of the through-hole 420. This O-ring groove GR is formed by cutting out the FDC flange 403 from the lower surface side thereof. A rubber O-ring RG (not shown in the drawing) is inserted into the O-ring grove GR. When the DC-DC converter 4 is fastened and fixed to the fuel cell casing 200, the lower part of the O-ring RG comes into contact with the top seal surface and this prevents the entry of water from outside through the fastening gap between the DC-DC converter 4 and the fuel cell casing 200.

Although it may be possible to form the O-ring groove GR on the top seal surface, considering the possibility that water could be collected within the O-ring groove GR in that case, the O-ring groove GR is desirably formed on the lower surface of the FDC flange 403, as in this embodiment.

In the fuel cell vehicle 1, once the DC-DC converter 4 is fastened and fixed to the fuel cell casing 200, it is not possible to visually confirm, from the outside, that the O-ring RG is inserted into the O-ring groove GR. However, considering the possibility that a mistake of not inserting the O-ring RG could occur during the assembly operation, it is desirable that the existence of the O-ring RG can be visually confirmed from the outside even in the state of the DC-DC converter 4 being fastened and fixed. FIG. 11 shows an example of the configuration that enables such confirmation. FIG. 11 is a bottom view illustrating a part (FDC flange 403) of a DC-DC converter 4a to be installed in a fuel cell vehicle according to another embodiment. The DC-DC converter 4a is the same as the DC-DC converter 4, except in the shape of the FDC flange 403.

As shown in FIG. 11A, in the DC-DC converter 4a, a vertical through-hole VH is formed at a portion outside the O-ring groove GR in the FDC flange 403. Further, the O-ring RG has an extension EX that extends from a part of the periphery of the O-ring RG toward the through-hole VH, and the tip of the extension EX is located inside the through-hole VH, when seen from above. With this configuration, even after the DC-DC converter 4 is fastened and fixed to the fuel cell casing 200, the existence of the O-ring RG can be visually confirmed by looking inside the through-hole VH from the upper surface side of the FDC flange 403.

Alternatively, as shown in FIG. 11B, the extension EX may be formed so as to extend rearward such that the tip of the extension EX is at a position beyond the end surface 451 of the FDC flange 403. With this configuration, the existence of the O-ring RG can be visually confirmed from the upper surface side of the FDC flange 403 without forming a through-hole VH in the FDC flange 403.

Figure 12:
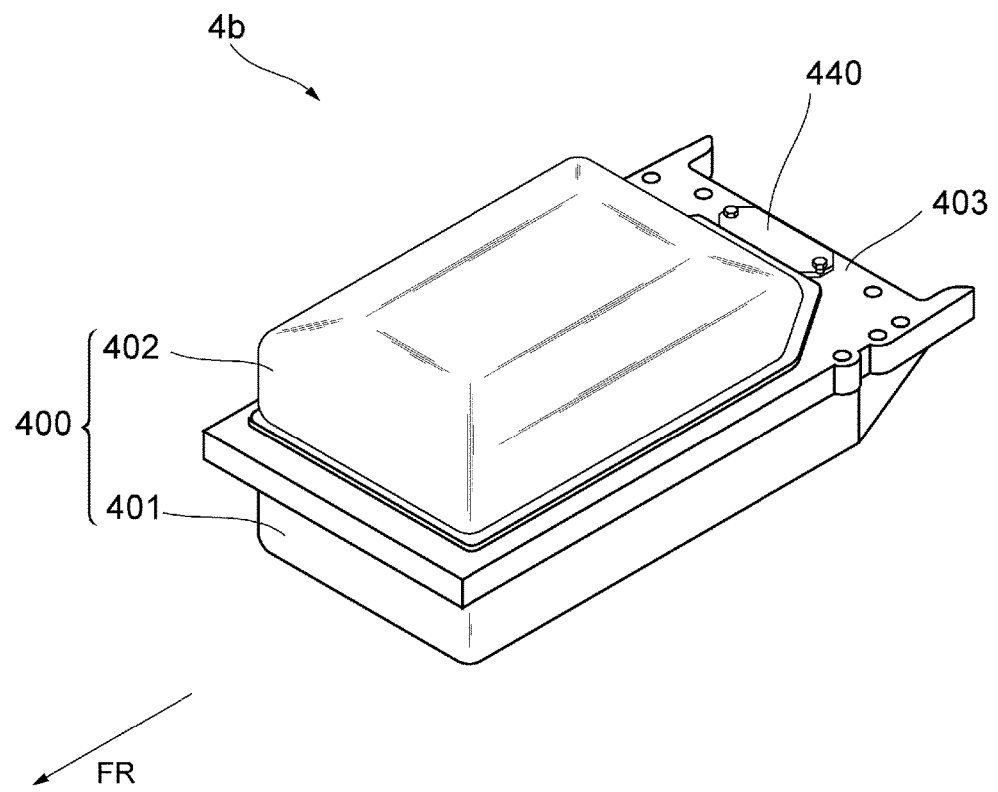
FIG. 12 is a perspective view illustrating the appearance of a DC-DC converter to be installed in a fuel cell vehicle according to another embodiment.

As shown in FIG. 10, etc., in the DC-DC converter 4 of the fuel cell vehicle 1 according to this embodiment, a part of the FDC cover 402 extends rearward so as to cover a part of the FDC flange 403 from above, and the protection cover 440 is attached to the FDC cover 402. As another embodiment, the protection cover 440 may be configured to be directly attached to the FDC flange 403, as shown in FIG. 12. FIG. 12 is a perspective view illustrating the appearance of a DC-DC converter 4b to be installed in a fuel cell vehicle according to another embodiment. As shown in FIG. 12, the DC-DC converter 4b is the same as the DC-DC converter 4, except in the shape of the FDC flange 403 and the shape of the FDC cover 402 at a portion close to the FDC flange 403.

Figure 13:
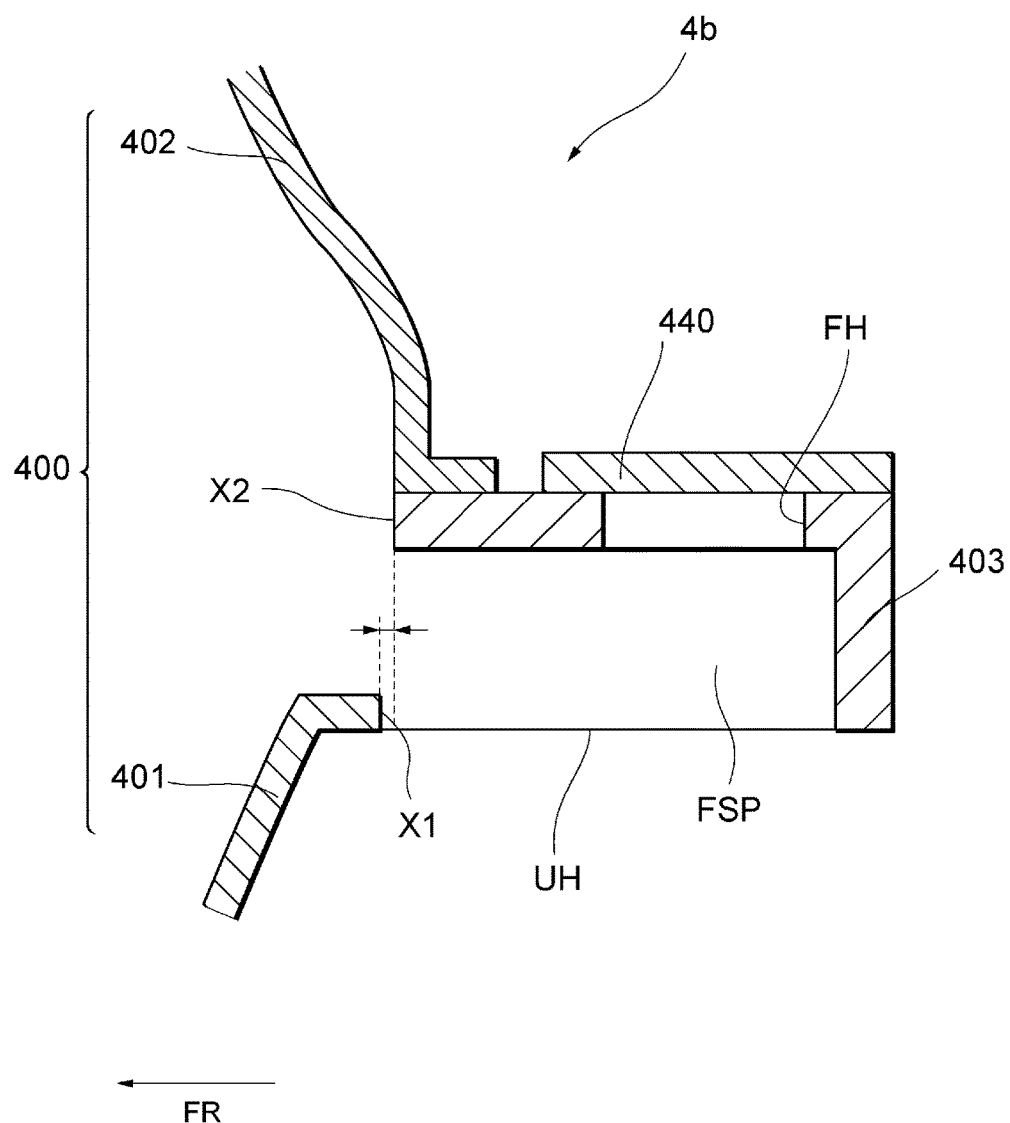
FIG. 13 is a schematic cross-sectional view for explaining the configuration of a portion of the DC-DC converter shown in FIG. 12 near an FDC flange.

FIG. 13 is a schematic cross-sectional view for explaining the configuration of a portion of the DC-DC converter 4b close to the FDC flange 403, and it schematically illustrates the cross-section in a direction perpendicular to the left-right direction. As shown in FIG. 13, in the FDC flange 403, a through-hole FH for performing the operation of fastening the bus bars (FDC bus bar 425, etc.) from above is formed further rearward of the rearward end of the FDC cover 402, and the through-hole FH is covered from above by the protection cover 440, which is directly attached to the top surface of the FDC flange 403.

On the lower surface side of the FDC flange 403, a fastening space FSP for fastening the FC bus bar 201 with the FDC bus bar 425 and fastening the FC bus bar 202 with the FDC bus bar 426 is formed. The fastening space FSP is formed so that it includes the through-hole FH, when seen from above. Further, the lower end of the fastening space FSP is made open, i.e., an opening UH is formed, for receiving the FC bus bars 201 and 202. Furthermore, the fastening space FSP communicates, at the forward side thereof, with the interior of the FDC container 400, so as to receive the FDC bus bars 425 and 426 that protrude from inside the FDC container 400 rearward.

As shown in FIG. 13, the forward end (X1) of the opening UH is located forward of the rearward end (X2) of the internal space of the FDC container 400. In other words, the fastening space FSP is formed so that a part thereof overlaps with the internal space of the FDC container 400 in the front-back direction. Accordingly, when the FDC casing 401 and the FDC flange 403 are formed integrally through resin molding, the fastening space FSP, the through-hole FH and the internal space of the FDC casing 401 can be formed by removing molds only in the vertical direction and there is no need to use certain molds which are removable in the left-right direction. Consequently, the FDC casing 401 can easily be formed.

Embodiments of the present invention have been described above, with reference to specific examples. However, the present invention is not limited to such specific examples. Design modifications to such specific examples, which will be made by a person skilled in the art as appropriate, are also included in the scope of the present invention, as long as they have the features of the present invention. For example, each element in each of the above-described specific examples and the arrangement, materials, conditions, shapes, dimensions, etc., of such element are not limited to those described above and may be modified as appropriate. In addition, each element in each of the above-described embodiments may be combined as long as such combination is technically possible and such combination is also included in the scope of the present invention as long as it has the features of the present invention.

DESCRIPTION OF REFERENCE NUMERALS

1: Fuel cell vehicle
2: Fuel cell apparatus
3: Fuel tank
4, 4a, 4b: DC-DC converter
5: Inverter
6: Traction motor
7: Radiator
8: Driver's seat
9: Front passenger's seat
10: Vent hole
200: Fuel cell casing
201, 202: FC bus bar
201a: First portion
201b: Second portion
203: FC seal surface
204: Through-hole
205: FC bus bar casing
205a: First horizontal part
205b: Vertical part
205c: Second horizontal part
206: Service cover
207, 208: Fastening base
209, 213: Fastening surface
210a, 210b, 210c, 214a, 214b, 214c: Bolt insertion hole
211, 215: Shaft
212, 216: Gap
217, 218: FC rib
220, 221: Fastening bolt hole
280: Bus bar supporting column
290: Fixation bolt hole
400: FDC container
401: FDC casing
402: FDC cover
403: FDC flange
406, 407: Plate-like projection
410a, 410b, 410c, 414a, 414b, 414c: Bolt through-hole
411, 415: Shaft through-hole
420: Through-hole
425, 426: FDC bus bar
427, 428: Fastening bolt hole
430: Through-hole
440: Protection cover
450: Recessed part
451: End surface
452, 453: Corner
454, 455: Tapered part
460, 461: FDC rib
490: Unit
491, 492, 493: Bolt
AU: Auxiliary device unit
EX: Extension
F1, F2: Fastening part
FH: Through-hole
FS: Fastening surface
FSP: Fastening space
GR: Ring groove
INC: Inclined part
PL: Protection bar
RG: Ring
RS: Curved part
SP: Service plug
UH: Opening
VH: Through-hole
WH: Wire harness
WL1, WL2, WL3: Anti-drop wall
BT1, BT2, BT3, BT4: Bolt
P: Pipe

What is claimed is:

1. A fuel cell vehicle comprising:
a fuel cell stack;
a fuel cell casing storing the fuel cell stack therein;
a converter with a container arranged forward of the fuel cell casing in the vehicle, the converter outputting electric power by increasing output voltage of the fuel cell stack,
wherein a protection bar is arranged between the fuel cell casing and the converter in a vehicle width direction,
wherein a first fastening part, which is attached to the fuel cell casing, and a second fastening part, which is attached to the container, are fastened and fixed to each other, with one of the first and second fastening parts overlapping the other, in a space above or below the protection bar,
wherein the protection bar is longer in the vehicle width direction than the length of the fuel cell in the vehicle width direction and the length of the converter in the vehicle width direction,
wherein the second fastening part is integrally formed in the container.

2. The fuel cell vehicle according to claim 1, wherein the first fastening part and the second fastening part are fastened and fixed to each other, with one of the first and second fastening parts overlapping the other, so that the first fastening part is below the second fastening part.

3. The fuel cell vehicle according to claim 2, wherein:
the first fastening part has a raised part that protrudes toward the converter;
the second fastening part has a recessed part that retracts in a direction opposite to the fuel cell casing; and
the first fastening part and the second fastening part are fastened and fixed to each other with the raised part and the recessed part being engaged with each other.

4. The fuel cell vehicle according to claim 3, wherein the raised part is formed such that a length thereof in the left-right direction of the vehicle gradually increases from top down of the vehicle.

5. The fuel cell vehicle according to claim 3, wherein the raised part has an internal space formed therein.

6. The fuel cell vehicle according to claim 5, wherein a part of a bus bar for extracting electric power from the fuel cell stack is arranged in the internal space.

7. The fuel cell vehicle according to claim 5, wherein a control unit for controlling the fuel cell stack is arranged in the internal space.

8. The fuel cell vehicle according to claim 4, wherein the raised part has an internal space formed therein.

9. The fuel cell vehicle according to claim 8, wherein a part of a bus bar for extracting electric power from the fuel cell stack is arranged in the internal space.

10. The fuel cell vehicle according to claim 8, wherein a control unit for controlling the fuel cell stack is arranged in the internal space.

11. A fuel cell vehicle comprising:
a fuel cell stack;
a fuel cell casing storing the fuel cell stack therein; and
a converter arranged forward of the fuel cell casing in the vehicle, the converter outputting electric power by increasing output voltage of the fuel cell stack,
wherein a protection bar is arranged between the fuel cell casing and the converter in a left-right direction of the vehicle,
wherein a first fastening part, which is attached to a side of the fuel cell casing, and a second fastening part, which is attached to a side of the converter, are fastened and fixed to each other, with one of the first and second fastening parts overlapping the other, in a space above or below the protection bar, and
wherein the converter is stacked directly on top of the fuel cell casing in a direction that is perpendicular to the longitudinal axis of the protection bar.

* * * * *